J. A. BUTTRESS.
AIR GAGE.
APPLICATION FILED APR. 8, 1911.

1,027,461.  
Patented May 28, 1912.

Witnesses:  
Clarence J Williams

Inventor,  
Joseph A. Buttress.  
by *Attorney*

UNITED STATES PATENT OFFICE.

JOSEPH A. BUTTRESS, OF LOS ANGELES, CALIFORNIA, ASSIGNOR OF ONE-FOURTH TO S. HERLINGER, OF LOS ANGELES, CALIFORNIA.

AIR-GAGE.

1,027,461.  Specification of Letters Patent.  Patented May 28, 1912.

Application filed April 8, 1911. Serial No. 619,698.

*To all whom it may concern:*

Be it known that I, JOSEPH A. BUTTRESS, a citizen of the United States, residing at Los Angeles, in the county of Los Angeles and State of California, have invented a certain new and useful Improvement in Air-Gages, of which the following is a specification.

This invention relates to a pressure indicating device and has particular reference to an air gage for determining the pressure of air in tires for power vehicles. In devices now used having similar functional properties the index or indicating element returns to its normal position of rest immediately upon the relief of pressure from the supply within the inclosed body, making in this manner incumbent upon the user the reading of the register before disconnecting with the tire or container.

One of the objects of this invention therefore is to provide a gage which registers the pressure of air within a tire or other receptacle, and in which the indicator remains in its position of original registration when removed from the source the pressure of which it has registered.

Another object of this invention is to provide in combination with an air gage, a valve mechanism which combines three distinct functions, namely: operates, or more properly stated, unseats the tire valve to permit the air to escape therefrom; is actuated or unseated to permit the air to enter the gage, and finally acts as a seal for the air that has entered the gage, when the gage has been removed from the source of pressure, the air thus confined serving to restrain the indicator from returning to normal position.

With these and other objects in view, this invention consists of the features, details of construction and combination of parts, as will be described in connection with the accompanying drawings and then be more particularly pointed out in the claims.

Figure 1:
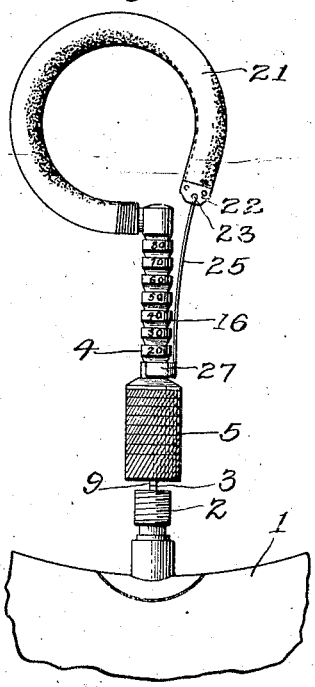
Figure 2:
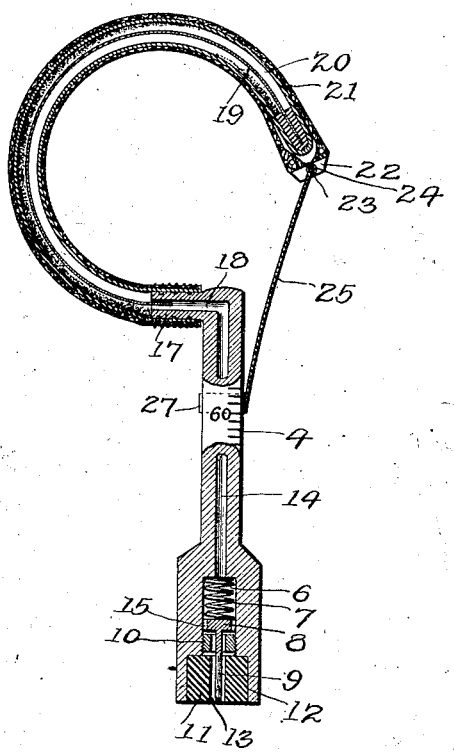
Figure 3:
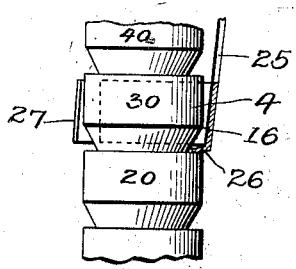
Figure 4:
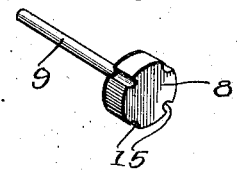

In the drawings—Figure 1 is a side elevation of my invention showing use of the same in connection with the valve of a tire; Fig. 2 is an enlarged sectional elevation, showing the position of the valve stem and valve when forced inwardly by a tire valve stem; Fig. 3 is a fragmentary detail of the scale, and the indicator coöperating therewith, and Fig. 4 is a perspective view of the valve showing the grooves or notches in the periphery thereof.

Specifically referring to the drawing 1 designates the fragment of a tire, provided with the ordinary inlet valve 2 the stem 3 of which is shown projecting from the top of the casing.

The gage forming the gist of the present invention consists of a scale 4, having a knurled end 5, within the recess 6 of which is housed a spring 7, exerting tension against a valve 8 which is provided with a stem 9. The valve and its stem are held in place within the end 5 by a nut 10, forming a seat for the valve 8 and through which nut the said stem 9 projects. A gasket of compressible material shown at 11 is placed in the hollow end 12 of the scale. This gasket 11 is provided with a central bore 13 into and through which the said stem 9 extends and terminates at a point slightly beyond the gasket and the knurled end 5 as seen in Fig. 1.

In Fig. 1 the stem 9 is shown in engagement with the stem 3 of the tire valve. The tension of the spring 7 against the valve 8 in the knurled end 5 being greater than the tension of the means for holding the tire valve stem in normally closed position, it is obvious that when depressed, the stem 9 will open or unseat the tire valve and permit the air to escape. Should this occur before the unseating of the valve on the stem 9, which unseating results by continued pressure when the tire valve stem 3 has reached the limit of its movement, the air from the tire will not escape to the atmosphere, because even though the valve of the stem 9 has not moved from its seat, the gasket 11 prevents such escape.

When the tire valve is fully open, the stem 9 will move the valve 8 from its seat 10 permitting thereby the air from the tire to enter the gage through the openings 15 provided therefor in the periphery of the valve. Immediately upon disconnecting the gage from the source of pressure the valve 8 will be forced in its seat 10 by the air confined in the gage. Since however a perfect seal for the air in the gage is not at all times possible, especially where grime, grease and dust have settled on the seat and between the seat and the valve, and for that reason a true and accurate registration of pressure is forestalled, I have devised a means presently described whereby the original registration will be indicated regardless of the escape of the air from the gage, and maintained until either the air is caused to escape from the gage in case the seal between the valve and its seal is perfect, or if the air has leaked out, the indicating member is returned to normal position. Said scale is provided with a series of notches or annular shoulders 16 and contiguous with or attached to the end of the same is a nipple 17, having a bore 18, which is continuous with the passage 14 of the scale 4. Extending transversely through and secured in any suitable manner to said nipple 17, is a resilient circular member 19, in the nature of a flat spring, the free end of which is made fast to a flexible, sealed tube or hose 20, in which said flat spring is housed. Said tube or hose 20 is arranged to fit over and engage the nipple 17 of the scale 4, and into this tube the volume of air from the tire or other source enters, causing a responsive expansion of the tube and the incased spring 19 proportionately with the pressure of the volume in the tire.

In Fig. 2 I have shown the end of the flat spring 19, embedded in a solid body of rubber, and in order to prevent dissociation, I prefer to serrate the end of the spring thus embedded.

The tube or hose 20 of rubber or other flexible material, is incased in a cover of leather or other material 21, one end of the same being fastened to a nipple 17, and the other end being sealed by a clasp 22. This clasp 22 carries a pintle 23, upon which are hung the butts 24 of an indicator 25, which encircles the scale 4 along which it is designed to travel. Said indicator 25 is provided with a lip 26 which is arranged to engage the notches or shoulders 16 of the scale 4.

The air entering through the scale to the tube 20 causes an expansion of the same against the tension of the flat spring 19, and as the pressure increases, the indicator 25 travels along the scale. When the gage is removed from the source of supply, the flat spring tends to resume its normal position, but the valve 8 having seated, the air in the gage cannot escape, and the flat spring as well as the indicator remains in position of original registration. As above pointed out, however, leakage between the valve and its seat cannot be absolutely guarded against, and if the air were solely relied on to register pressures, the registrations would be unreliable. If the seal for the air in the gage were defective or functionally ineffective, the variations in registration from the time of actual application of the gage to a later period would be considerable and would not show true pressure of the fluid body. But the lips 26 engaging the shoulders of the scale prevent such variations. Therefore when the gage is removed, its indicator registers the exact amount of pressure within the tire and after the air has been allowed to escape from the gage, only a slight touch at the joint between the indicator and casing for the tube is necessary to free the lip from engagement with the shoulders, and effect its return to normal position.

The indicator 25 is slightly yielding to allow for the angularity of travel, the tendency of which is not in a direct vertical line, and the fingers 27 thereof fit closely about the said scale, whereby the indicator is preserved against careless handling and removal from the scale by any excess pressure, its movement being limited by the nipple 17.

As shown in Fig. 2, the scale may be perfectly smooth, since, if the valve forms a perfect seal for the air, no supplemental means will be necessary to hold the indicator in position of registration.

What I claim is:

1. An air gage comprising a bored scale having an indicator operatively connected therewith, a fluid pressure operating means for said indicator and a member in one end of said scale for unseating a container valve to admit air to said scale, and cause a movement of said indicator on said scale, said member being operable when removed from the container to seal the air in the scale to hold the indicator in position of indication.

2. An air gage comprising a bored scale having an indicating member operatively connected with said scale, a fluid pressure controlled tube connecting said indicating member with said scale, a spring-pressed valve in said scale, having a projection operable on movement of said scale in one direction to unseat a tire valve and admit air to the interior of said scale, and automatically operable on movement of the scale in the reverse direction to seal the air in said scale to hold the indicating member in position of indication.

3. An air gage comprising a bored scale, having a tube expansible by fluid pressure, an indicator connected with said tube and scale, a valve in said bored scale having a stem, a means to hold said valve normally closed and the stem thereof projected, said stem being arranged to unseat a tire valve, and move the gage valve when the tire valve has reached the limit of its movement, said gage valve being automatically operable to seal the air in said bored scale.

4. An air gage comprising a bored scale having an indicating member operatively connected therewith, a fluid pressure controlling means for said member, a valve in said scale, a spring to hold said valve stationary to unseat a tire valve, said scale valve being movable in one direction when the tire valve has reached the limit of its movement, and automatically movable in the opposite direction to seal the air in said scale and hold the indicator in position of indication, when disconnected from the tire valve.

5. An air gage comprising a bored scale having an indicating member operatively connected therewith, expansible means connecting said member with said scale, a compressible seat at one end of said scale arranged to fit against the casing of a tire valve, a valve in said scale, means on said scale valve to unseat a tire valve, means to hold said scale valve stationary during such unseating, said scale valve being movable in one direction when the tire valve has reached the limit of its movement, to allow the air from the tire to enter the scale and operate the indicator, and movable in the opposite direction to seal the air in said scale to hold the indicator in position of indication, when disconnected from said tire valve.

In testimony whereof I affix my signature in the presence of two witnesses.

JOSEPH A. BUTTRESS.

Witnesses:
 ANTON GLOETZNER, Jr.,
 F. J. McCLARY.